(12) United States Patent
Abramovitch et al.

(10) Patent No.: US 7,987,006 B2
(45) Date of Patent: Jul. 26, 2011

(54) AUTOMATIC GENERATION OF PID PARAMETERS FOR A SCANNING PROBE MICROSCOPE

(75) Inventors: Daniel Y Abramovitch, Palo Alto, CA (US); Storrs T. Hoen, Brisbane, CA (US); Richard K. Workman, Sunnyvale, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 165 days.

(21) Appl. No.: 11/846,746

(22) Filed: Aug. 29, 2007

(65) Prior Publication Data

US 2009/0062935 A1    Mar. 5, 2009

(51) Int. Cl.
*G05B 13/02*    (2006.01)
*G06F 19/00*    (2011.01)

(52) U.S. Cl. .............................. 700/42; 700/29; 850/4

(58) Field of Classification Search .................. 700/28, 700/29, 31, 32, 34, 37, 42, 55, 56; 250/309, 250/311, 201.3, 234; 378/43; 359/368, 382; 356/501; 850/1, 4, 5, 7, 21
See application file for complete search history.

(56) References Cited

U.S. PATENT DOCUMENTS

| | | | |
|---|---|---|---|
| 5,466,935 A * | 11/1995 | Ray et al. ......................... | 850/4 |
| 6,189,374 B1 * | 2/2001 | Adderton et al. ............... | 73/105 |
| 6,297,502 B1 * | 10/2001 | Jarvis et al. ....................... | 850/7 |
| 6,530,266 B1 * | 3/2003 | Adderton et al. ............... | 73/105 |
| 6,672,144 B2 * | 1/2004 | Adderton et al. ............... | 73/105 |
| 6,810,720 B2 * | 11/2004 | Adderton et al. ............... | 73/105 |
| 6,845,190 B1 * | 1/2005 | Smithwick et al. ............. | 385/25 |
| 6,981,417 B1 * | 1/2006 | Oravecz .......................... | 73/619 |
| 7,017,398 B2 * | 3/2006 | Adderton et al. ............... | 73/105 |
| 7,036,357 B2 * | 5/2006 | Adderton et al. ............... | 73/105 |
| 7,204,131 B2 * | 4/2007 | Adderton et al. ............... | 73/105 |
| 2006/0027739 A1 * | 2/2006 | Warren et al. ................. | 250/234 |

* cited by examiner

*Primary Examiner* — Charles R Kasenge

(57) ABSTRACT

Linear PID controllers have a transfer function that resembles the frequency response of a notch filter. The PID parameters, $K_P$, $K_I$, and $K_D$ (proportional, integral, and derivative gains, respectively) can be extracted from the parameters of a linear notch filter. The linearized modes of scanning probe microscope (SPM) actuators have frequency responses that resemble those of simple second order resonance. Reasonable feedback control can be achieved by an inverse dynamics model of the resonance. A properly parameterized notch filter can cancel the dynamics of a resonance to give good closed-loop response.

18 Claims, 15 Drawing Sheets

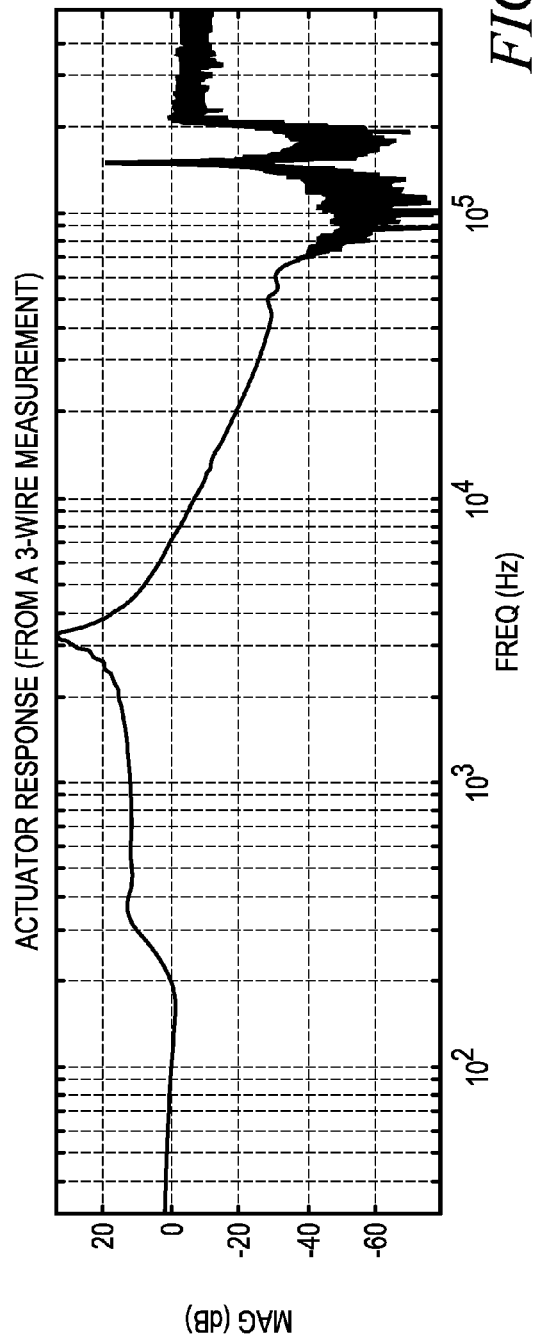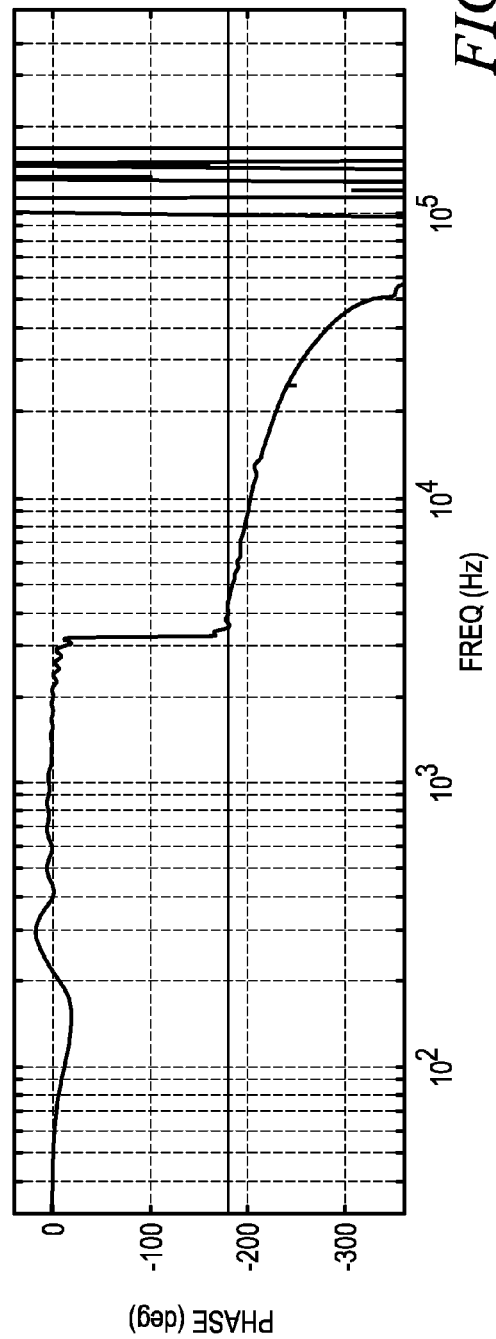
FIGURE 5A
FIGURE 5B

US 7,987,006 B2

AUTOMATIC GENERATION OF PID PARAMETERS FOR A SCANNING PROBE MICROSCOPE

BACKGROUND

A proportional-integral-derivative controller (PID controller) is a control loop feedback mechanism commonly used in industrial control systems, e.g. a Scanning Probe Microscope (SPM). A PID controller attempts to correct the error between a measured process variable and a desired setpoint by calculating and then outputting a corrective action that can adjust the process accordingly.

FIG. 1 shows a block diagram of a scanning probe microscope. The input to the PID controller is the error signal from the surface sensor, and the controller output is used to move an actuator, e.g. Z actuator, that ultimately controls the relationship between the probe and surface.

The input to the PID controller is the error signal and the output of the controller is the voltage or current used to drive the actuator. The responsiveness of the controller is set with the coefficients $K_P$, $K_I$, and $K_D$ as shown below:

$$u = K_P e + \frac{K_I}{T_I} \int e \, dt + K_D T_D \frac{de}{dt} \qquad \text{Eq. 1}$$

$T_I$ represents the integration time and $T_D$ represents the differentiation time, e.g. the amount of time that the integral and the differentiation take place over. It is common, but certainly not necessary to set these to a common value, T. Alternately, their values can be included in the calculation of $K_I$ and $K_D$, respectively.

The PID controller calculation involves three separate components; the Proportional component, the Integral component and Derivative component. The proportional component determines the reaction to the current error, the integral component determines the reaction based on the current and all previous errors and the derivative component determines the reaction based on the rate by which the error is changing. The weighted sum of the three components is output as a corrective action to a control element.

By adjusting constants in the PID controller algorithm, the PID can provide individualized control specific to process requirements including error responsiveness, overshoot of setpoint and system oscillation.

SUMMARY

Linear PID controllers have a transfer function that can be set to resemble the frequency response of a notch filter. For these settings they have high gain at low frequency (due to the integrator), high gain at high frequency (due to the differentiator, and a minimum in between. Practical implementations of a PID use filtering to roll off the gain at very high frequencies.

The PID parameters, $K_P$, $K_I$, and $K_D$ (proportional, integral, and derivative gains, respectively) can be extracted from the parameters of a linear notch filter.

The main linearized mode of scanning probe microscope (SPM) actuators have frequency responses that can be modeled as a simple second order resonance.

Reasonable feedback control can be achieved by using an inverse dynamics model of the resonance. A properly parameterized notch filter can adjust the dynamics of a resonance to give good closed-loop response. This enables control at closed-loop bandwidths beyond the frequency of the main linearized mode of the SPM actuator.

BRIEF DESCRIPTION OF THE DRAWINGS

FIGS. 5A and 5B illustrate an actuator response from a 3-wire measurement.

DETAILED DESCRIPTION

Figure 1:
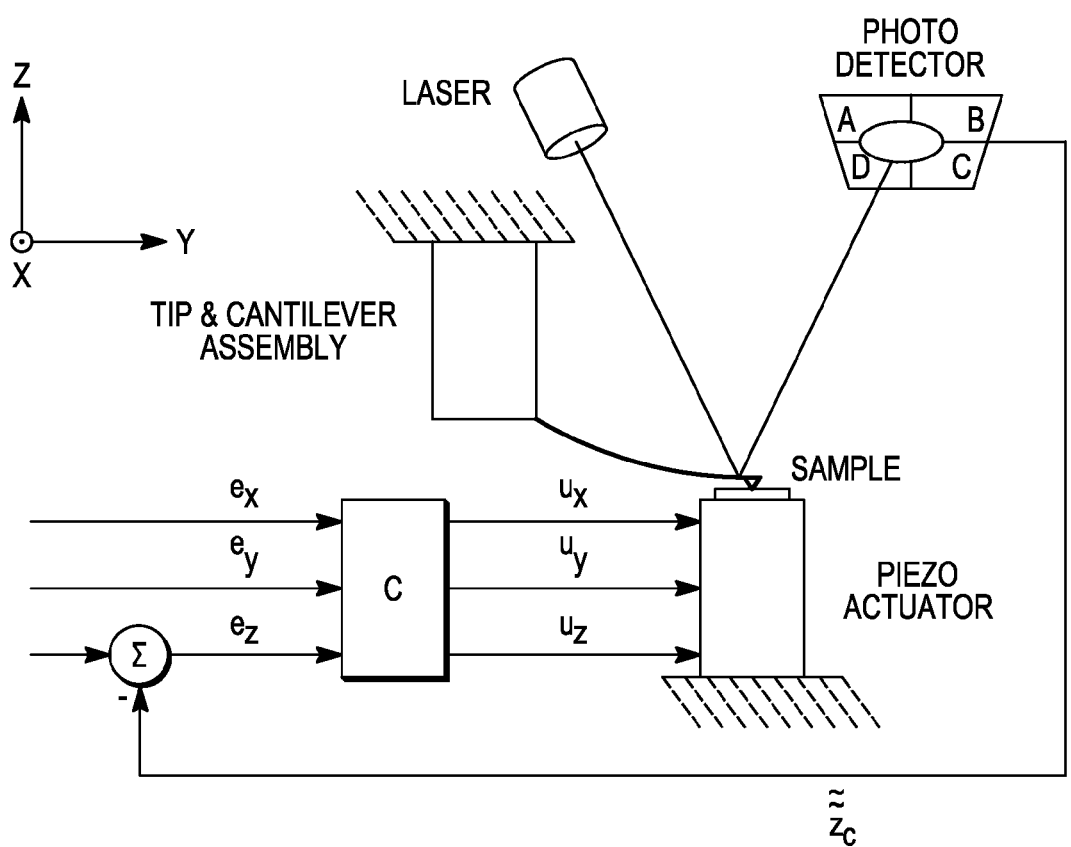
FIG. 1 illustrates a block diagram for a scanning probe force microscope system (PRIOR ART).

FIG. 1 is a block diagram of one type of scanning probe force microscope (SPM) system, e.g. a scanning sample design, where the sample is moved and the cantilever base is kept stationary. Other designs may move the cantilever in addition to or in place of moving the sample. There are three axes of motion for a typical SPM system. Any one of these may have a feedback loop controlling it. In FIG. 1, the X and Y axes are open loop and the Z axis is closed-loop. Furthermore, all three axes are moved by a 3 degree of freedom piezo actuator. It is important to know that other actuation methods are possible, such as having a MEMS actuator in the Z direction and having closed-loop control on the X and/or Y axes.

While the invention will be described with respect to Z axis control, the concepts can be easily extended to any of the axes of motion of a SPM.

Figure 2:
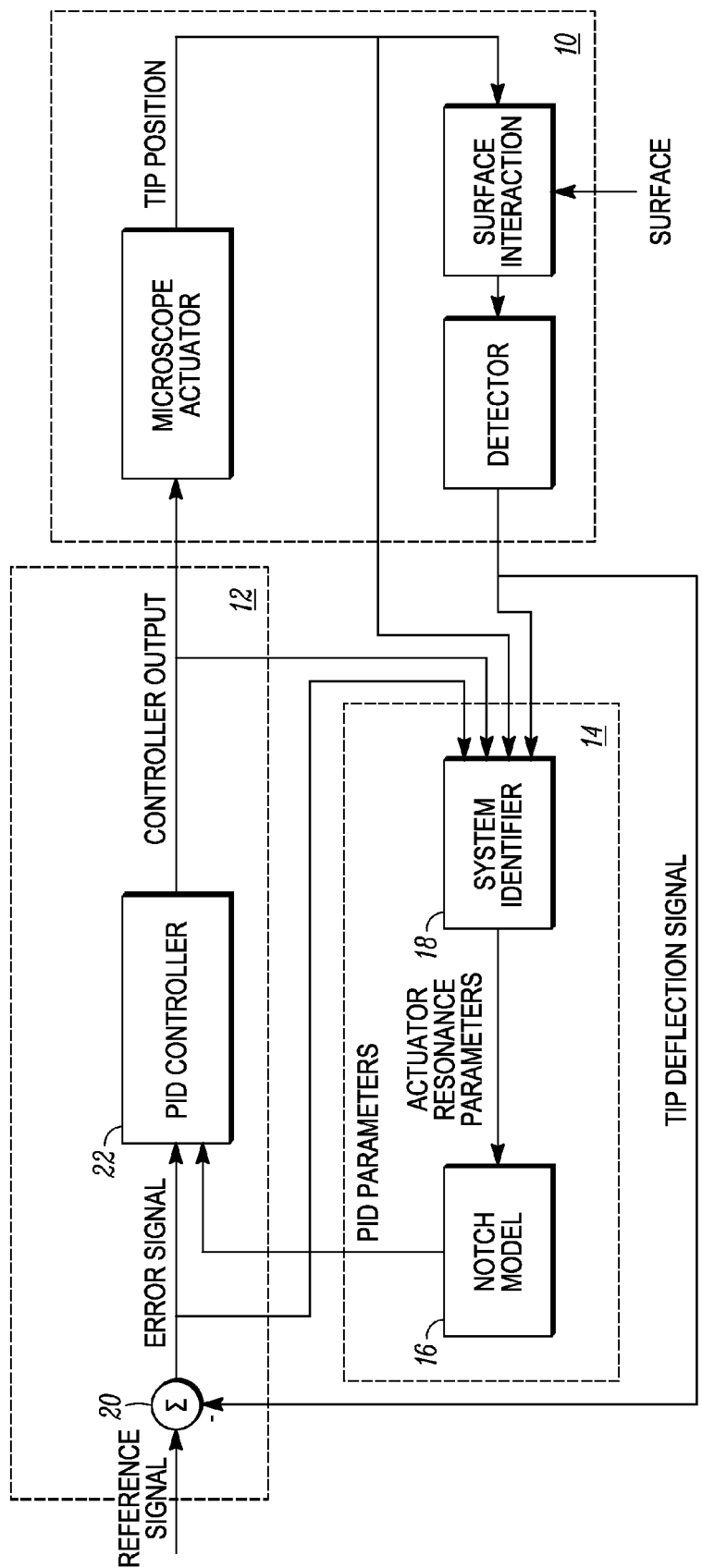
FIG. 2 shows a block diagram according to the invention.

FIG. 2 illustrates a block diagram according to the invention. A scanning probe microscope 10 is controlled by a controller block 12. A controller design block 14 adjusts the operation of the controller block 12.

Within the controller block 12, a summer 20 receives a reference signal and a tip deflection signal. The output of the summer 20 is received by a PID controller 22 which generates a controller output signal. The PID controller 22 further receives an input from the controller design block 14. Filtering may be added to mitigate the effects of system dynamics, e.g. higher frequency resonances of the cantilever.

The controller block 12 receives a reference signal from the microscope 10 and design parameters from the controller design block 14. The controller forms an error signal and uses a PID design to generate a controller output that is used to control the microscope 10.

The controller design block 14 includes a notch filter model 16 and a system identifier 18. The system identifier 18 receives signals from the controller block 12 and the microscope 10. The output of the system identifier 18 are parameters corresponding to the actuator resonance. These parameters are used to design a notch filter by the notch filter model 16. The notch filter model 16 generates a set of PID parameters that are transmitted to the controller block 12.

Figure 3:
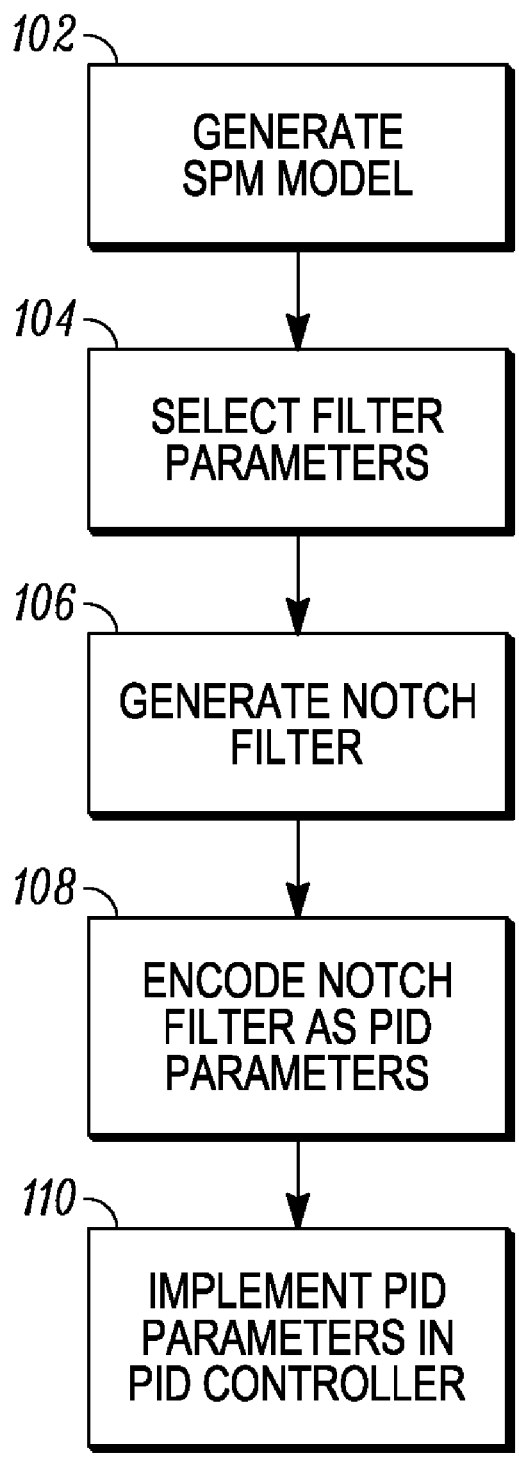
FIG. 3 illustrates a process flow chart according to the invention.

FIG. 3 illustrates a process flow chart according to the invention. In step 102, a model for the scanning probe microscope dynamics is generated. In step 104, filter parameters that shape selected dynamics of the model are chosen. In step 106, a notch filter is generated using the filter parameters. In step 108, the notch filter is encoded as PID parameters. In step 110, the PID parameters are implemented in a PID controller to control the scanning probe microscope.

For step 106, one method would be to select the gain of the notch filter so that the overall magnitude of controller response is at a desired value for a given frequency. Alternatively, the gain of the notch filter can be selected so that the open loop magnitude of the combined controller and actuator response is unity at a desired frequency.

The model for the scanning probe microscope dynamics may be a continuous-time, a sampled-data, or a discrete-time model. These models can often be well represented as a filter, although they represent physical devices. The controller models can also be represented as filters. The term filter can be used to represent a model of a physical system, a controller, or an implementation of a controller model. In a continuous-time model, the signals are continuously fed into the filter elements, which in turn continuously process them. Such filters are commonly generated using analog circuitry. In a discrete-time model, the signals are measured at discrete sample points and converted to digital signals through the use of mixed signal circuits such as an analog to digital converter (ADC). The processing of these signals is also done using digital circuitry, such as a microprocessor, a digital signal processor (DSP), or a field programmable gate array (FPGA). Some of the processed signals may then be sent back to the physical system via digital to analog converters (DACs). A sampled data model is more general than a discrete-time model in that it may include systems where one or more of the signals are sampled, but the processing may be done using analog circuitry. These definitions are well known to those skilled in the art. For the purposes of this disclosure, the models to be discussed will be either continuous-time models or discrete-time models. However, it will be clear to those skilled in the art that the invention can be applied to more general systems such as sampled-data systems or hybrid systems where the physical system contains continuous time and discrete time components.

It is well known to those skilled in the art that controllers may be designed using continuous-time models and implemented discretely using so-called discrete equivalents. Alternately, controllers may be implemented directly in analog form, or they may be designed using discrete-time methods from discrete-time models of the system in question.

Figure 4:
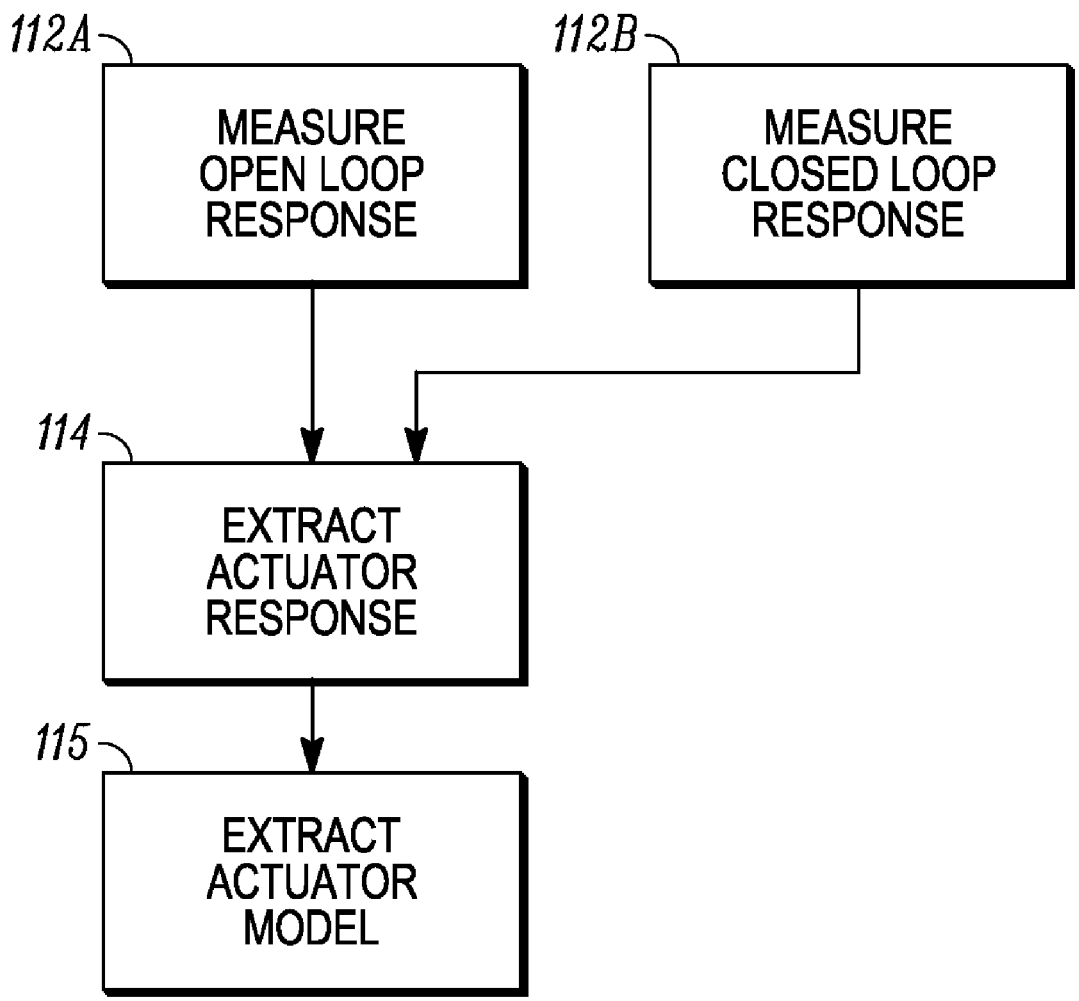
FIG. 4 illustrates a process flow chart for continuous-time model generation.

The continuous-time model may be generated in a multitude of ways, two of which can be seen from FIG. 4. In step 112A, the model is generated by measuring an open-loop frequency response measurement of the scanning probe microscope. Alternatively, in step 112B, the model is generated by measuring a closed-loop frequency response of the scanning probe microscope. In step 114, a corresponding actuator response of the scanning probe microscope dynamics is extracted. In step 115, the actuator model is extracted.

Figure 6:
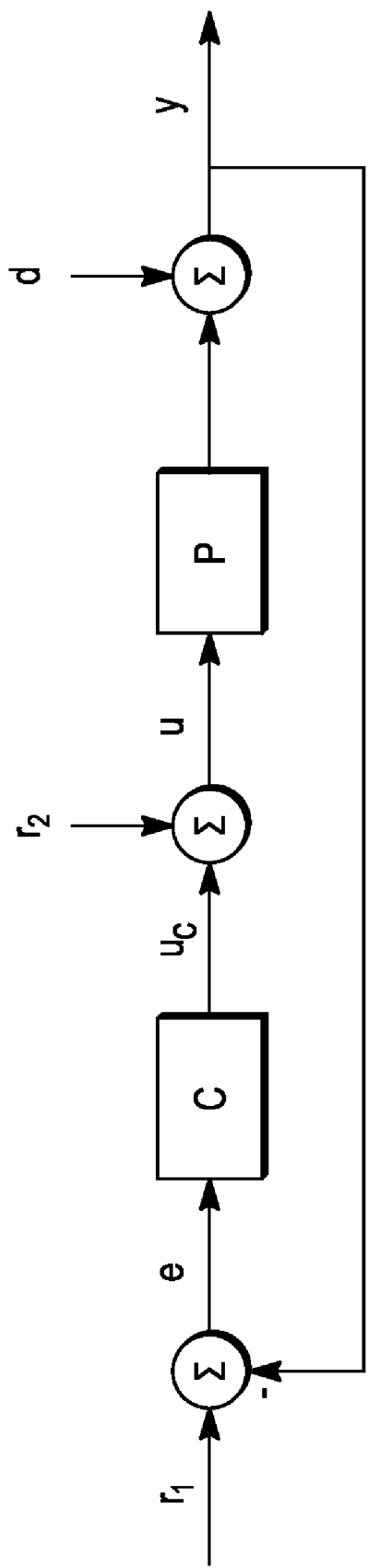
FIG. 6 illustrates a block diagram corresponding to continuous model generation.
Figure 7A:
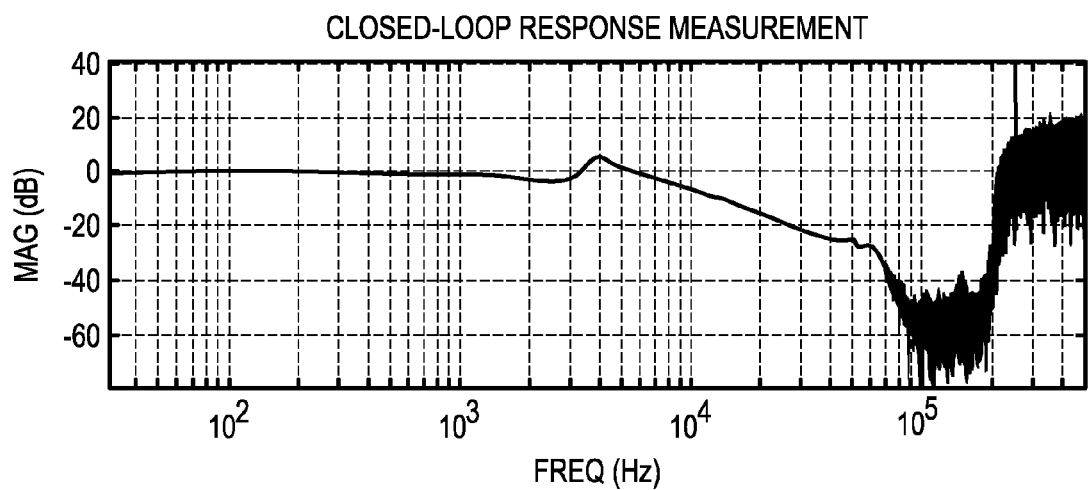
FIGS. 7A and 7B illustrate a closed loop frequency response from $r_1$ to y.
Figure 7B:
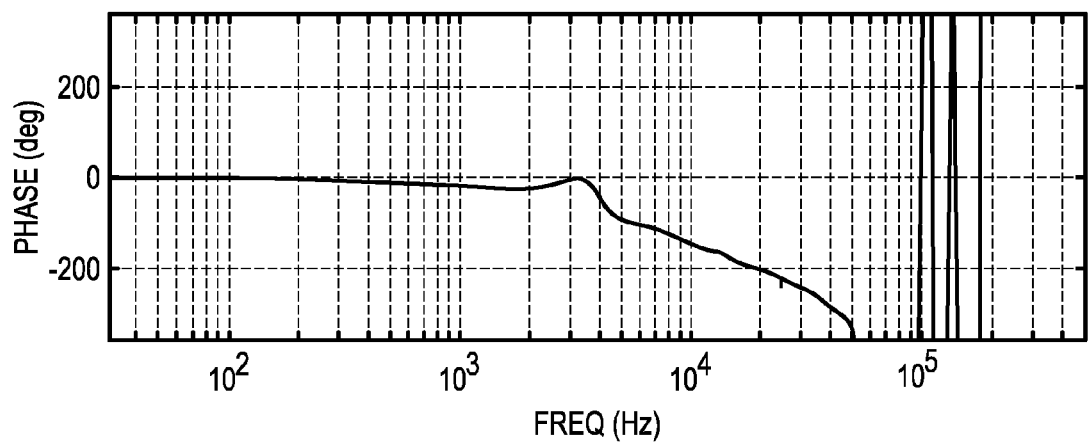
Figure 8A:
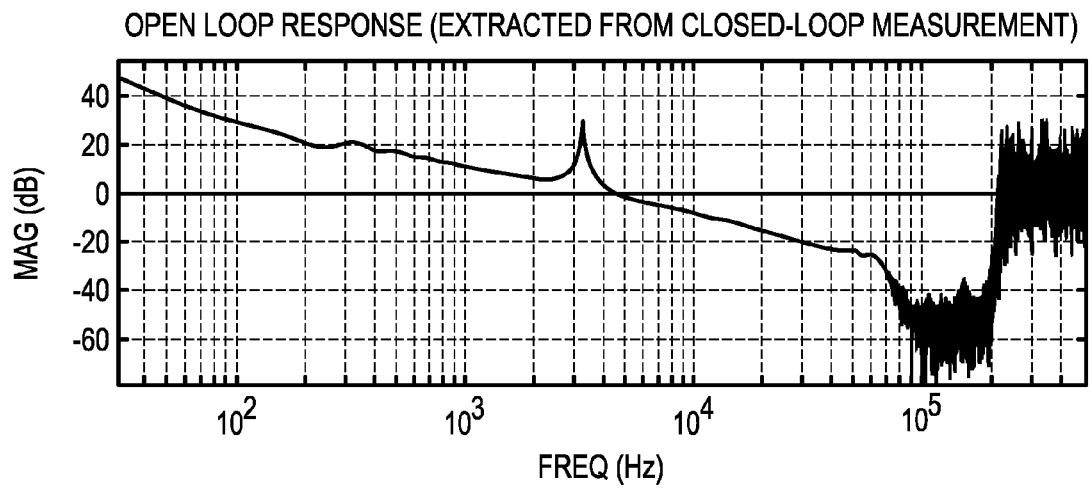
FIGS. 8A and 8B illustrate the open loop frequency response from $r_1$ to y extracted from a closed loop measurement.
Figure 8B:
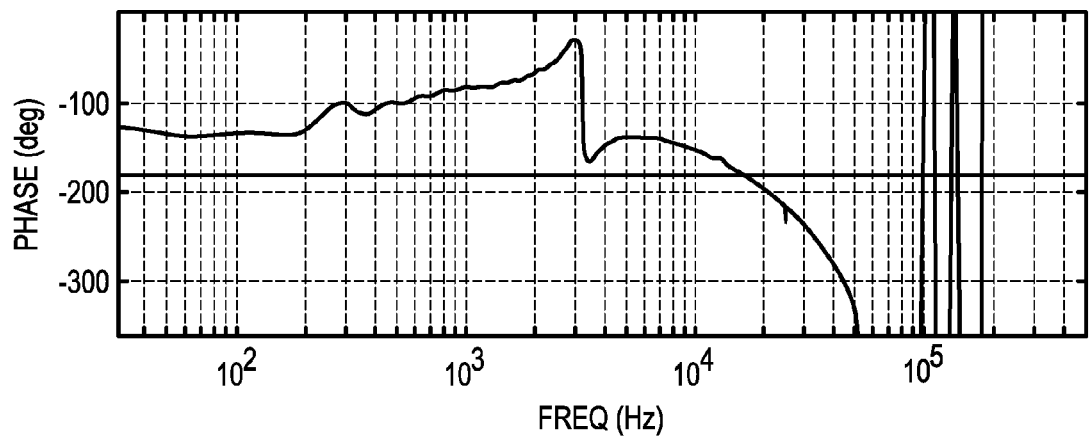
Figure 9A:
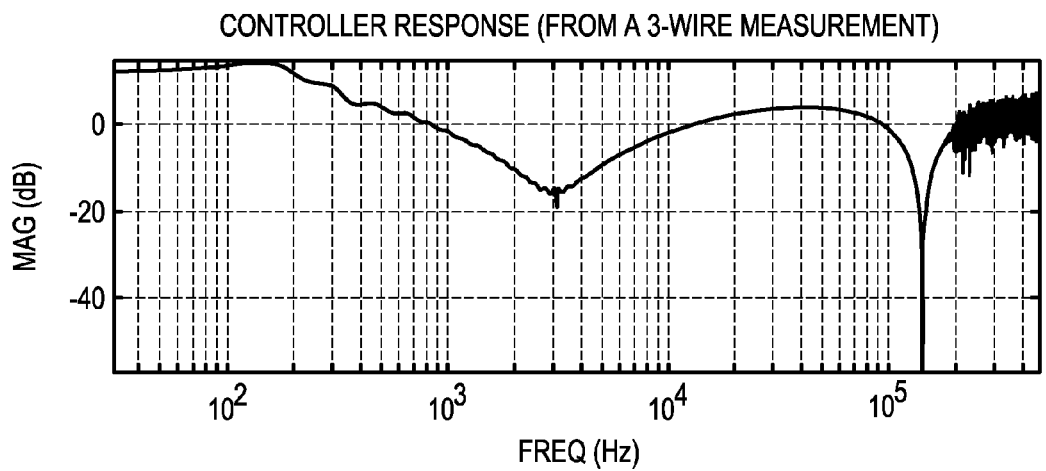
FIGS. 9A and 9B illustrate the frequency response measurement from e to $u_C$ of a compensator.
Figure 9B:
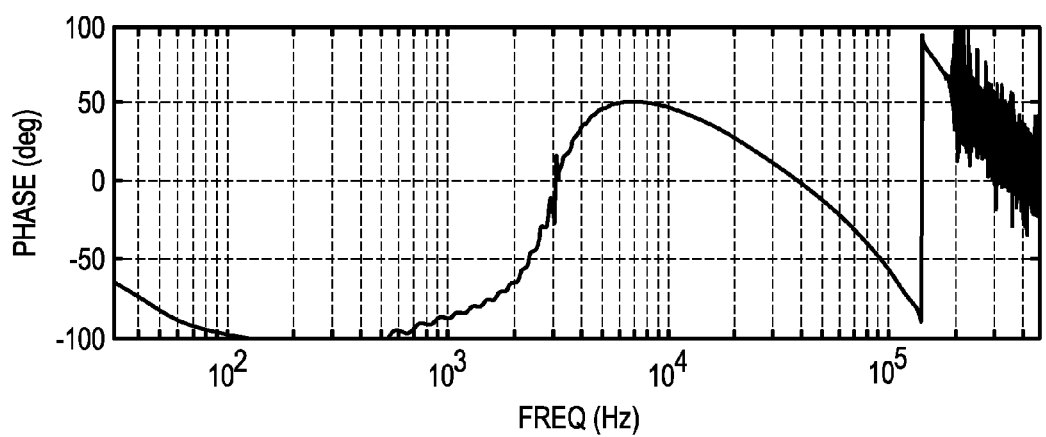
Figure 10A:
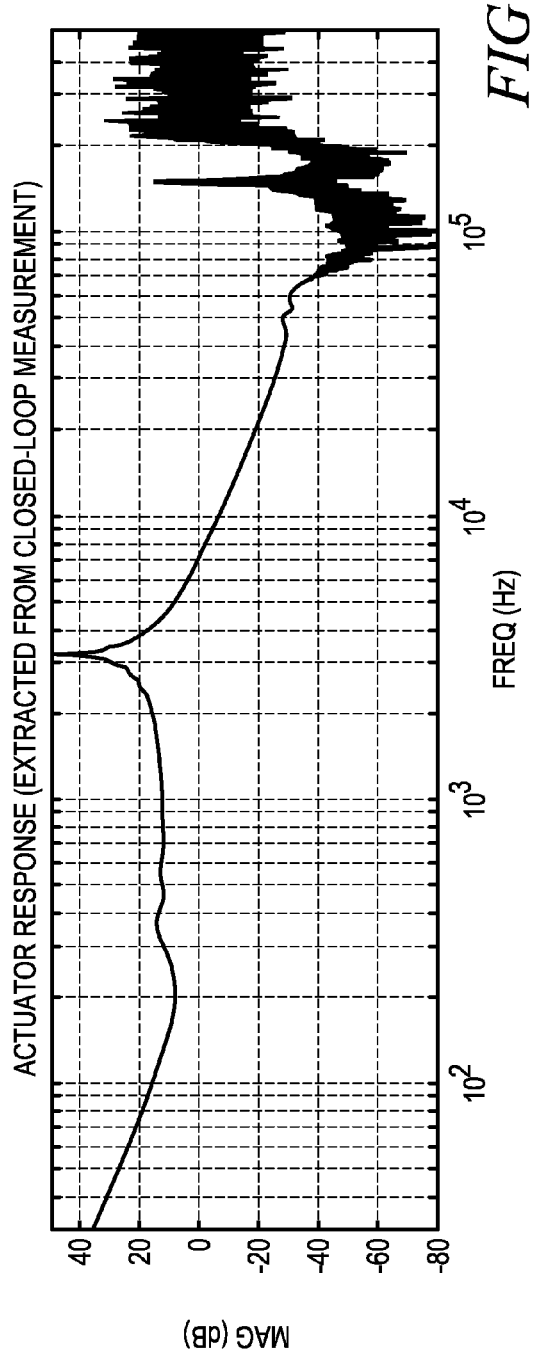
FIGS. 10A and 10B illustrate the actuator frequency response function extracted from a closed loop measurement.
Figure 10B:
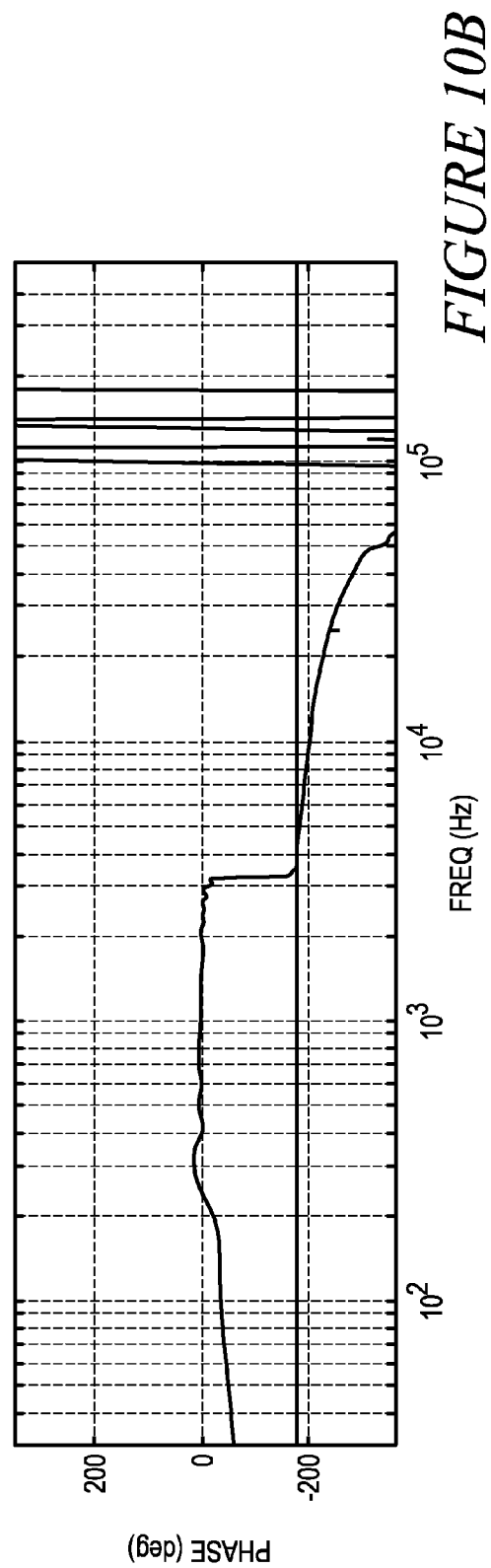

For a closed-loop measurement, the actuator response may be measured using a 3-wire measurement (illustratively shown in FIGS. 5A and 5B). In a 3-wire measurement, a signal is injected into the loop at a convenient location, e.g. r in FIG. 6, and signals from the controller output and actuator, e.g. $u_c$ and y in FIG. 6 are measured. If y is not available, it can be reconstructed from e if we know the value of r. Alternately, the closed-loop response of the system (illustratively shown in FIGS. 7A and 7B) can be measured, e.g. 2-wire measurement from $r_1$ to y in FIG. 6, and this can be unwrapped to reveal the open-loop response (illustratively shown in FIGS. 8A and 8B). A frequency response measurement of the compensator (illustratively shown in FIGS. 9A and 9B), e.g. from e to $u_C$ in FIG. 6, can be divided out to reveal the actuator frequency response function (illustratively shown in FIGS. 10A and 10B).

The frequency response functions may be computed in several ways. The system can be stimulated with white or colored noise or with a chirped sine signal. From any of these, the frequency responses can be calculated using DFT or FFT based methods. Alternately, the system may be stimulated using a method known as swept-sine or sine-dwell. A sinusoidal signal at a single frequency is injected into the system for an extended time. Once the system has reached steady state, various system outputs are measured. These measured outputs are mixed with a related sinusoidal signal, e.g. input signal, using both in-phase (0 degrees phase) and quadrature (+/−90 degrees phase) signals. These signals are then integrated to yield demodulated signals from which the complex response at the input frequency is obtained (and from which the magnitude and phase can be extracted). By doing this at a desired set of frequencies, a frequency response function (FRF) can be extracted. FRFs generated using swept sine methods typically have better signal to noise ratios (SNR) than FFT based FRFs.

Figure 11A:
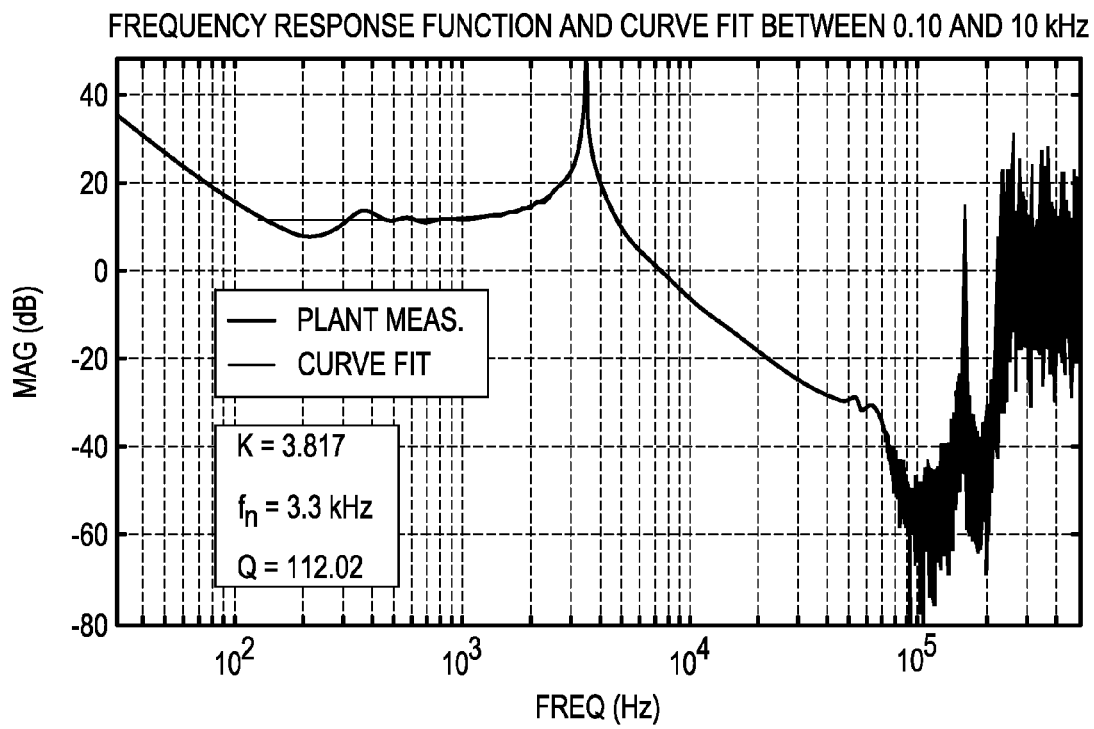
FIGS. 11A and 11B illustrate a curve fit model for a second order system.
Figure 11B:
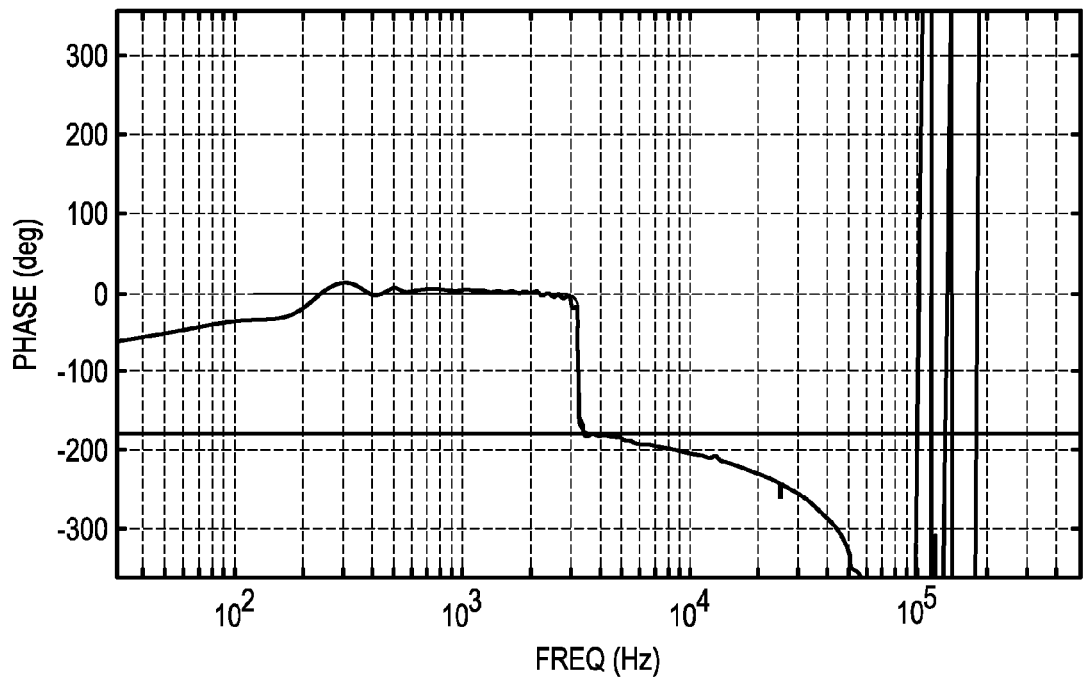

After the frequency response function (FRF) is generated for the frequencies of interest, a parametric model of the actuator is generated. This can be done using curve fitting. A general curve fit model may be used. Alternately, restricting the order of the curve fit model to a second order system may be used when since the actuator's linear response is second order. The models may be obtained from the full FRF or from the magnitude response alone. This is illustratively shown in FIGS. 11A and 11B.

Figure 12:
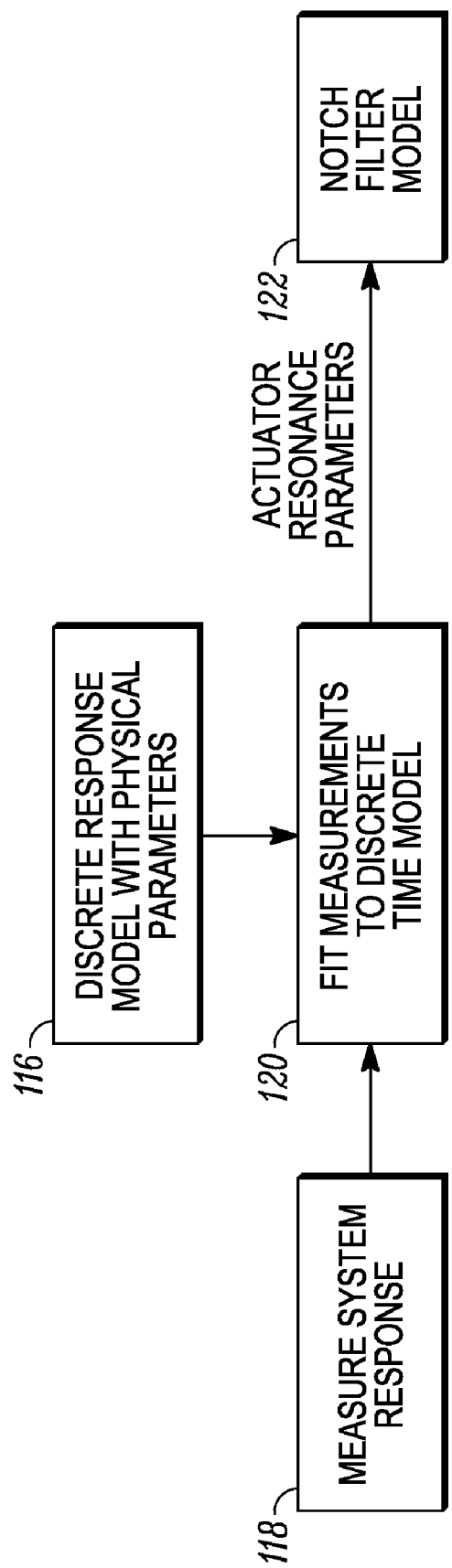
FIG. 12 illustrates a process flow chart for discrete model generation.

The discrete-time model can be generated as shown in FIG. 12. In step 116, the response model with physical parameters is discretized. In step 118, the system response is measured. In step 120, the measurements are fit to the discrete time model from step 116. This results in a set of values for the physical parameters from step 116, which are used in step 122 to generate the notch filter and the PID controller parameters. Steps 118 and 120 may be accomplished in the time or frequency domain.

Figure 13A:
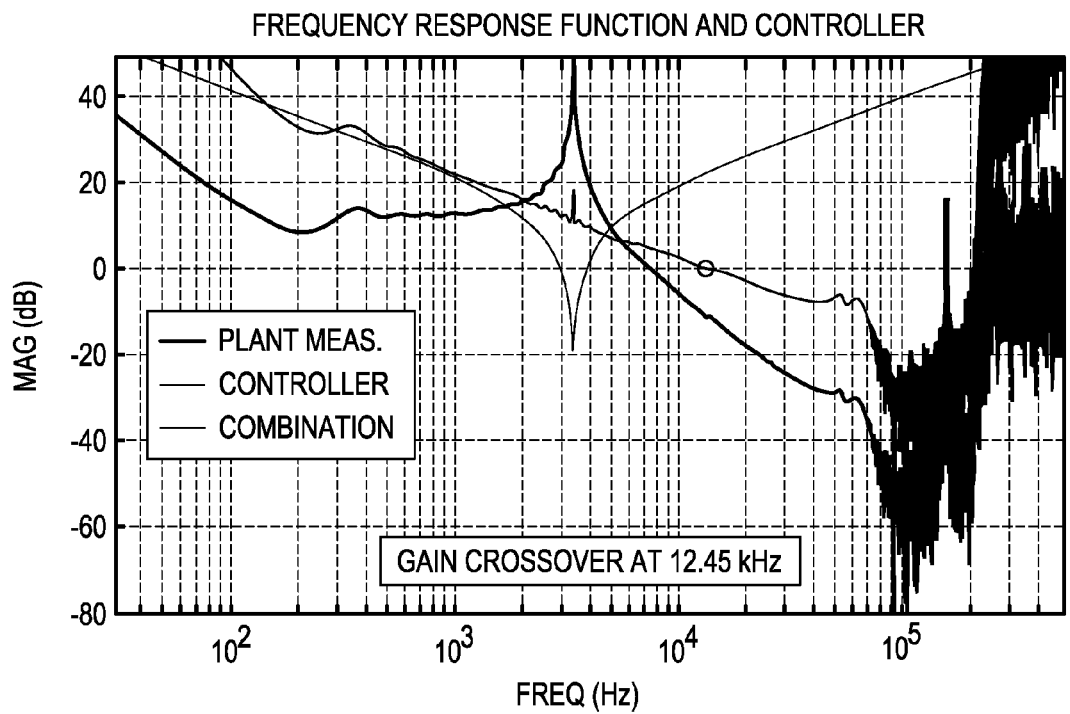
FIGS. 13A and 13B illustrate the frequency response beyond the main resonant frequency.
Figure 13B:
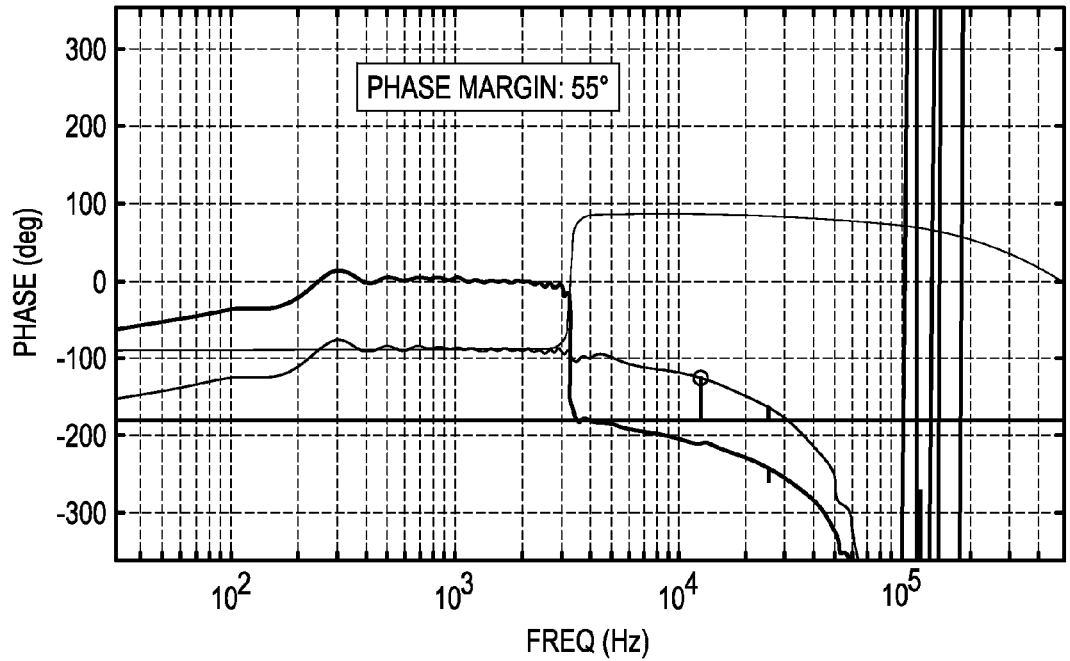
Figure 14A:
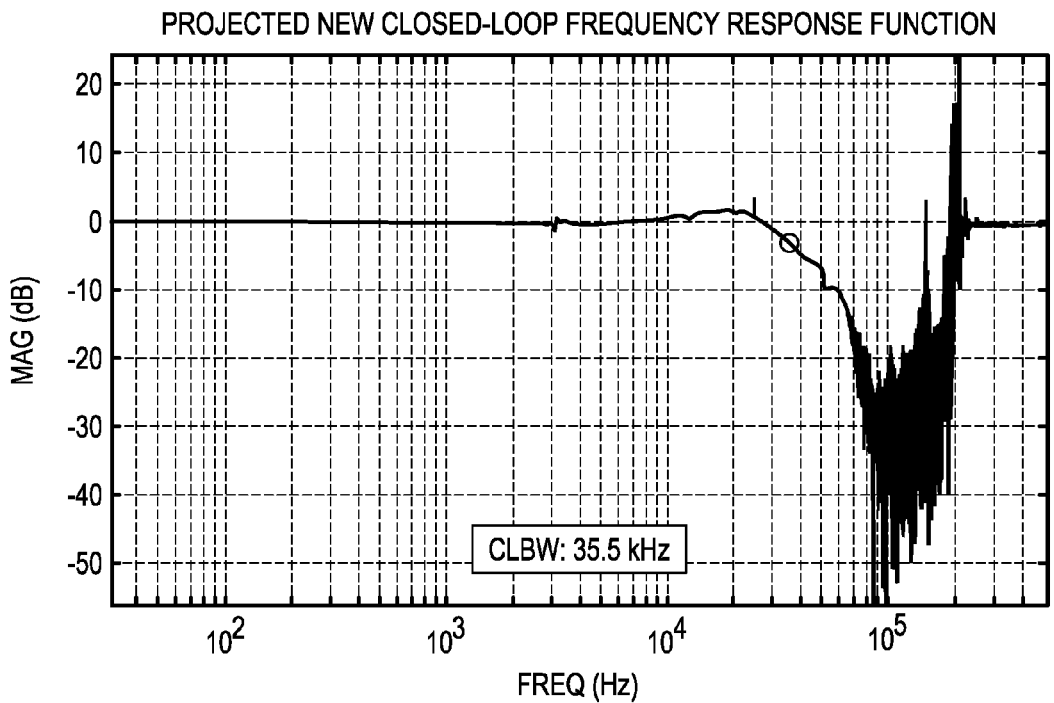
FIGS. 14A and 14B illustrate the projected closed loop frequency response.
Figure 14B:
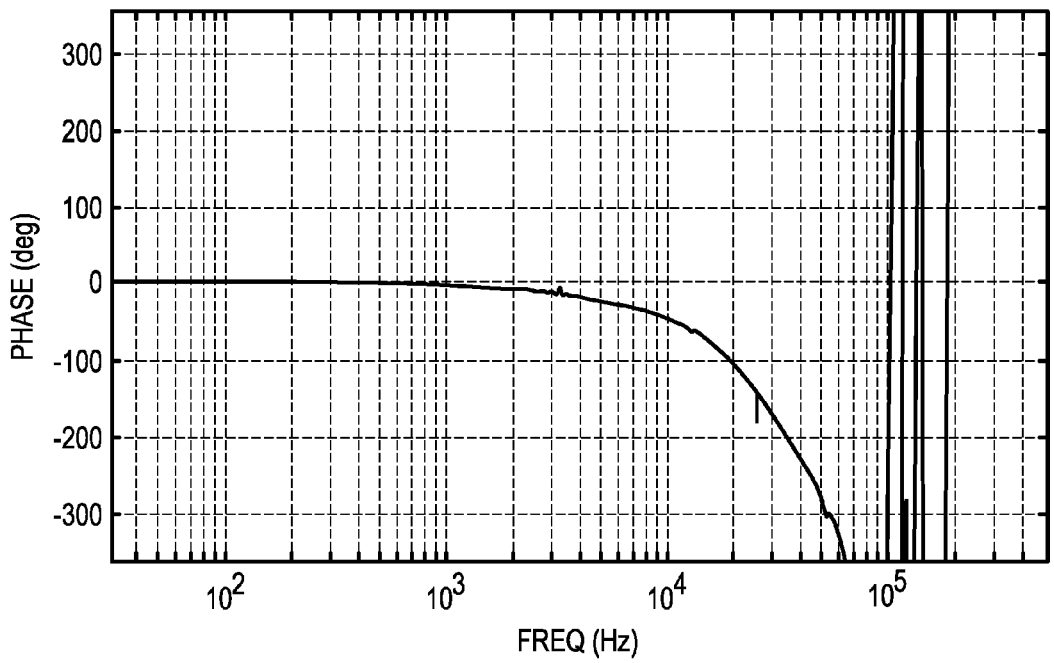

The notch filter and PID parameters can be directly generated from either the continuous-time or discrete-time model. The filter parameters correspond to a notch filter with a gain K, center frequency $\omega_0$ and quality factor $Q_C$. The resulting PID controller enables the system to be controlled at frequencies beyond the main resonant frequency (shown in FIGS. 13A and 13B). The projected closed-loop frequency response function is shown in FIGS. 14A and 14B.

The resulting PID controller may be implemented using either analog or digital circuitry.

Next, while generating the model for the inventive concept will be illustrated for a continuous-time model (as in FIG. 6) and for a discrete-time model (as FIG. 15) for PID parameter generation, it will be apparent to one skilled in the art that the methods may be combined.

Continuous-time Model Using Frequency Response

The SPM model is generated (step 102) by measuring the frequency response function of the SPM and extracting the frequency response function of the actuator. The frequency response function of the actuator is fit to a second order transfer function model. Next, the gain, resonant frequency, and quality factor (K, $w_0$, Q) of the resonance from the second order fit are derived. This is done by matching terms, e.g.

$$H(s) = \frac{1}{A_0 s^2 + A_1 s + A_2} \qquad \text{Eq. 2}$$

$$= \frac{\frac{1}{A_0}}{s^2 + \frac{A_1}{A_0} s + \frac{A_2}{A_0}}$$

$$= \frac{K_A \omega_n^2}{s^2 + \frac{\omega_n}{Q_A} s + \omega_n^2}$$

where the three transfer functions have terms that can be extracted from a curve fit or a direct on-line adaptation. The third term is in terms of resonant parameters.

$$\omega_n = \sqrt{\frac{A_2}{A_0}} \qquad \text{Eq. 3}$$

$$Q_A = \frac{1}{A_1}\sqrt{A_0 A_2}$$

$$K_A = \frac{1}{A_2}$$

Next, as in steps 104 and 106, an inverse filter based on ($K_A$, $\omega_n$, $Q_A$), e.g. a notch filter with a gain at K, center frequency $\omega_0$ and quality factor $\alpha Q_C$. Typically $Q_C$, is equal to $\alpha Q_A$, where $0 < \alpha \leq 1$. Often $\omega_0$ is close to or equal to $\omega_n$. By picking the center frequency of the notch equal to the center frequency of the resonance, the notch dip is positioned at the maximum value of the resonance. $\alpha=1$ corresponds to complete cancellation of the resonance (for an idealized notch filter with no poles) where $0<\alpha<1$ allows the notch to be broader and not be so sensitive to small changes in $\omega_0$. The analog actuator model may be optionally discretized to yield a digital transfer function model, e.g. $P_1(z)$, $P_2(z)$, or $P_3(z)$.

Next, as in step 108, the linear notch filter is mapped into the PID gains: $K_P$, $K_I$, and $K_D$. An idealized PID (without derivative filtering) is described as:

$$C(s) = \frac{U(s)}{E(s)} \qquad \text{Eq. 4}$$

$$= K_P + \frac{K_I}{Ts} + K_D Ts$$

$$= \frac{K_D T}{s}\left[s^2 + \frac{K_P}{K_D} \frac{s}{T} + \frac{K_I}{K_D T^2}\right]$$

$$= \frac{K}{\omega_0^2 s}\left[s^2 + \frac{\omega_0}{Q_C} s + \omega_0^2\right]$$

In this equation, for simplification $T=T_I=T_D$ although similar results can be obtained without this simplification.

From the above, $$K_D = \frac{K}{\omega_0^2 T} \qquad \text{Eq. 5}$$

$$K_I = KT$$

$$K_P = \frac{K}{\omega_0 Q_C}$$

A PID with a first order derivative filter is described as:

$$C(s) = \frac{U(s)}{E(s)} \qquad \text{Eq. 6}$$

$$= K_P + \frac{K_I}{Ts} + K_D \frac{Ts}{Ts + a_1}$$

$$C(s) = \frac{(K_P + K_D)\left[s^2 + \frac{K_P a_1 + K_I}{(K_P + K_D)} \frac{s}{T} + \frac{K_I a_1}{(K_P + K_D)T^2}\right]}{s\left(s + \frac{a_1}{T}\right)}$$

$$= \frac{K\left[s^2 + \frac{\omega_0}{Q_C} s + \omega_0^2\right]}{\omega_0^2 s\left(s + \frac{a_1}{T}\right)}$$

Those skilled in the art will recognize that higher order filtering can be used, either on the derivative term alone or on the entire controller.

From the above, $$K_P + K_D = \frac{K}{\omega_0^2} \qquad \text{Eq. 7}$$

$$K_I = \frac{KT^2}{a_1}$$

$$K_P = \frac{KT^2}{a_1}\left(\frac{1}{Q_C \omega_0 T} - \frac{1}{a_1}\right)$$

Next, as in step 110, the PID gains are mapped into a practical implementation. Practical PID loops consider the effects of high frequency noise on the signals and thus include additional filtering of high frequency signals. The design considerations include integrator wind-up for which anti-windup methods are known to those skilled in the art.

Discrete Model

In one discrete model embodiment, as in step 110, the digital frequency response of the system is measured. As in step 112, the digital frequency response of the motor is extracted. As in step 114, the model parameters are fit to yield a digital transfer function model of the motor, e.g. $P_1(z)$, $P_2(z)$, or $P_3(z)$.

In another discrete model embodiment (step 102), the response may be characterized as $$P(s) = \frac{K_A \omega_o^2}{s^2 + 2\zeta_A \omega_o s + \omega_o^2} \text{ where } \zeta_A = \frac{1}{2Q_A} \qquad \text{Eq. 8}$$

The poles of the filter are at $$s = \omega_o(-\zeta_A \pm \sqrt{\zeta_A^2 - 1}) \qquad \text{Eq. 9}$$

If $\zeta_A<1$ then the poles are a complex pair. If $\zeta_A=-1$ then, the poles are real and identical. If $\zeta_A>1$, then the poles are real and distinct. For a resonant structure $\zeta_A<1$. For $\zeta_A<1$, $s=\omega_o(-\zeta_A\pm j\sqrt{1-\zeta_A^2})$, where j is $\sqrt{-1}$. For pole zero mapping, the poles at $s_p$ are mapped to $z_p=e^{s_p\tau}$. Finite zeroes at $s_z$ are mapped to $z_z=e^{s_z\tau}$. Zeroes at $s=\infty$ are mapped to $z_\infty=-1$. The gain of the digital model is chosen to match the gain of the analog model at a critical frequency. Often, this is the DC gain, but it could be the resonant frequency.

Using pole zero mapping $$P_1(z) = \frac{K_1\omega_o^2(z+1)^2}{z^2 - 2e^{-\omega_o T_s \zeta_A}\left(\cos\left(\omega_o T_s\sqrt{1-\zeta_A^2}\right)\right)z + e^{-2\zeta_A\omega_o T_s}} \quad \text{Eq. 10}$$

Alternately, one zero may be positioned at $z=-\infty$ and one at $z=-1$, $$P_2(z) = \frac{K_2\omega_o^2(z+1)}{z^2 - 2e^{-\omega_o T_s \zeta_A}\left(\cos\left(\omega_o T_s\sqrt{1-\zeta_A^2}\right)\right)z + e^{-2\zeta_A\omega_o T_s}} \quad \text{Eq. 11}$$

The DC gain of the analog model may be matched by $P(0)=K$, by setting $$K_A = P_1(1) \quad \text{Eq. 12}$$
$$= \frac{K_1\omega_o^2(2)^2}{1 - 2e^{-\omega_o T_s \zeta_A}\left(\cos\left(\omega_o T_s\sqrt{1-\zeta_A^2}\right)\right) + e^{-2\zeta_A\omega_o T_s}}$$

$$K_A = P_2(1) \quad \text{Eq. 13}$$
$$= \frac{K_2\omega_o^2(2)}{1 - 2e^{-\omega_o T_s \zeta_A}\left(\cos\left(\omega_o T_s\sqrt{1-\zeta_A^2}\right)\right) + e^{-2\zeta_o\omega_A T_s}}$$

$$\text{So } K_1 = K_A\left(\frac{1 - 2e^{-\omega_o T_s \zeta_A}\left(\cos\left(\omega_o T_s\sqrt{1-\zeta_A^2}\right)\right)z + e^{-2\zeta_A\omega_o T_s}}{4\omega_o^2}\right) \quad \text{Eq. 14}$$
$$= \frac{K_2}{2}$$

Another embodiment to match the measured response is to allow some other zero in the discrete model.

$$P_3(z) = \frac{K_3\omega_o^2(z+1)(z-b)}{z^2 - 2e^{-\omega_o T_s \zeta_A}\left(\cos\left(\omega_o T_s\sqrt{1-\zeta_A^2}\right)\right)z + e^{-2\zeta_A\omega_o T_s}}, \quad \text{Eq. 15}$$
where $-1 < b < 1$ $$P_3(1) = K_A \Rightarrow K_3 \quad \text{Eq. 16}$$
$$= K_A\left(\frac{1 - 2e^{-\omega_o T_s \zeta_A}\left(\cos\left(\omega_o T_s\sqrt{1-\zeta_A^2}\right)\right) + e^{-2\zeta_A\omega_o T_s}}{2(1-b)}\right)$$

The motor response can be measured in one of several ways. Other variations include measuring the analog frequency response of the system, extracting the analog frequency response of the motor.

In another discrete model embodiment, as in step 110, the samples of the inputs and outputs of the motor are measured in discrete time, e.g. $\{u(k), u(k-1), \ldots, u(k-n)\}$, where $\{y(0), y(1), \ldots, y(k-n)\}$ are related by $$\frac{Y(z)}{U(z)} = e^{-j\Delta\tau}\frac{b_o + b_1 z^{-1} + b_2 z^{-2}}{1 + a_1 z^{-1} + a_2 z^{-2}} \quad \text{Eq. 17}$$

where $\Delta\tau$ is time delay.

Those skilled in the art will also recognize that there are many design methodologies that can generate the response of a notch filter. These methods include—but are not limited to—state-space methods and optimization methods such as $H^2$ and $H^\infty$ design.

In another illustrative example, the model is generated using Discrete-Time, Time Domain Identification of SPM Dynamics. The discrete time filter parameters are generated from time response measurements by running a second order model of the actuator in parallel with the measured system. The inputs and the output of the system and the model can be compared. The model adjusted to minimize some cost criterion of the error, e.g. on-line adaptation.

Digital filters can be represented as transfer functions in the z transform operator, z:

$$\frac{Y(z)}{U(z)} = \frac{b_0 z^n + b_1 z^{n-1} + b_2 z^{n-2} + \ldots + b_n}{z^n + a_1 z^{n-1} + a_2 z^{n-2} + \ldots + a_n} \quad \text{Eq. 18}$$

or equivalently in the unit delay operator, $z^{-1}$:

$$\frac{Y(z)}{U(z)} = \frac{b_0 + b_1 z^{-1} + b_2 z^{-2} + \ldots + b_n z^{-n}}{1 + a_1 z^{-1} + a_2 z^{-2} + \ldots + a_n z^{-n}} \quad \text{Eq. 19}$$

It is worth noting that the transfer functions in Equations 18 and 19 are not unique. One could easily multiply the numerator and denominator by the same numbers to yield equivalent transfer functions. However, this representation has an advantage in that the coefficient of the output term. y(k), in the equations below is 1.

This gets implemented in a filter as:

$$y(k)=-a_1 y(k-1)-a_2 y(k-2)-\ldots-a_n y(k-n)+b_0 u(k)+b_1 u(k-1)+\ldots+b_n u(k-n) \quad \text{Eq. 20}$$

Alternately, we can use a direct form filter which reduces storage requirements. (There was an extra figure for this if you want to use it.)

$$d(k)=-a_1 d(k-1)-a_2 d(k-2)-\ldots-a_n d(k-n)+u(k) \quad \text{Eq. 21}$$

$$y(k)=b_0 d(k)+b_1 d(k-1)+\ldots+b_n d(k-n)$$

When digital filters are implemented in an adaptive scheme, the Z transform is no longer applicable as the coefficients are varying. However, the unit delay operator is still valid. To avoid confusion, it is common for those skilled in the area to replace the unit delay operator $z^{-1}$ with the equivalent unit delay operator, $q^{-1}$. Since the latter is not associated with the Z transform (which is not valid when the coefficients are varying) confusion is avoided.

If the system model is unknown then an estimate can be generated using:

$$\hat{y}(k)=-\hat{a}_1 y(k-1)-\hat{a}_2 y(k-2)-\ldots-\hat{a}_n y(k-n)+\hat{b}_0 u(k)+\hat{b}_1 u(k-1)+\ldots+\hat{b}_n u(k-n) \quad \text{Eq. 21}$$

For simplicity, the noise free case will be discussed here, but those skilled in the art will recognize that equivalent results are available when the system has noise.

If one compares the measured output to the output of the system model one gets:

$$\epsilon(k)=y(k)-\hat{y}(k) \quad \text{Eq. 23}$$

$$\epsilon(k)=y(k)-[\hat{a}_1 y(k-1)-\hat{a}_2 y(k-2)-\ldots-\hat{a}_n y(k-n)+\hat{b}_0 u(k)+\hat{b}_1 u(k-1)+\ldots+\hat{b}_n u(k-n)] \quad \text{Eq. 22}$$

This can be rewritten as:

$$\epsilon(k)=y(k)-\phi^T(k)\hat{\theta}(k) \quad \text{Eq. 25}$$

Where $$\phi^T(k)=[-y(k-1),-y(k-2),\ldots,-y(k-n),u(k),\\ u(k-1),\ldots,u(k-n)] \text{ and}$$

$$\hat{\theta}^T(k)=[\hat{a}_1,\hat{a}_2,\ldots,\hat{a}_n,\hat{b}_0,\hat{b}_1,\ldots,\hat{b}_n)].$$

The parameters in $\hat{\theta}^T(k)=[\hat{a}_1, \hat{a}_2, \ldots, \hat{a}_n, \hat{b}_0, \hat{b}_1, \ldots +\hat{b}_n)]$ can be adjusted through a variety of schemes with the goal of having them converge to the true model of the system, $\theta^T(k)=[\hat{a}_1, \hat{a}_2, \ldots, \hat{a}_n, \hat{b}_0, \hat{b}_1, \ldots +\hat{b}_n)]$. Commonly used algorithms well known to those skilled in the art include methods that minimize the mean squared error, $e^2(k)$, such as Least Mean Squares (LMS), Recursive Least Squares (RLS), or algorithms that are modifications of these (such as Filtered-X LMS).

Figure 15:
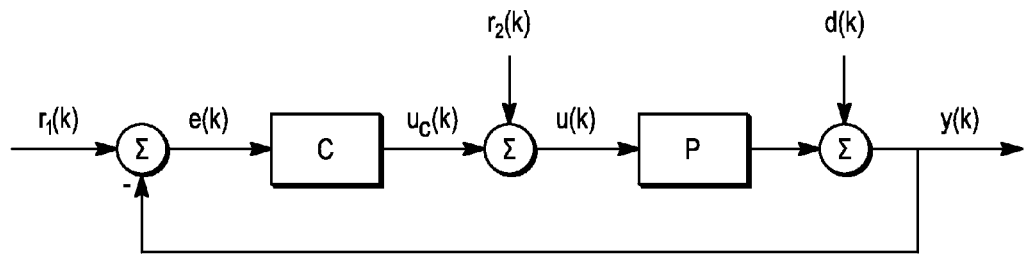
FIG. 15 illustrates a block diagram corresponding to discrete model generation.
Figure 16:
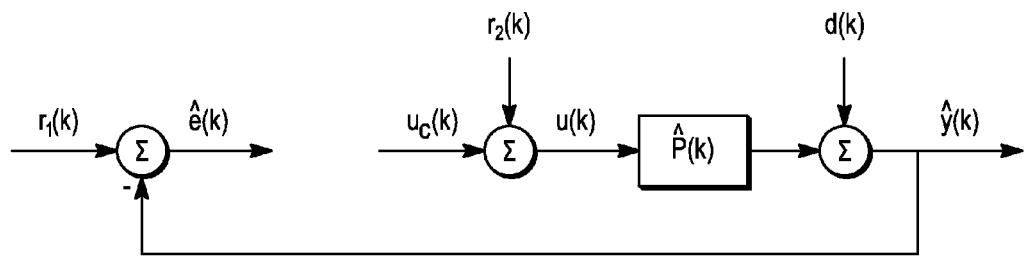
FIG. 16 is a block diagram of a parameter estimator in discrete time.

In FIG. 15, a discrete-time model of the system is shown. In FIG. 16, the pieces of the block diagram that need to be replicated for doing system identification are shown. What is important to note, is that the identification block diagram of FIG. 16 is fed by all the available inputs and outputs of the system. If the system is run in closed-loop, then the estimation algorithm is fed the closed-loop quantities. If it is run in open loop, then the estimation algorithm is fed the open loop quantities.

Figure 17:
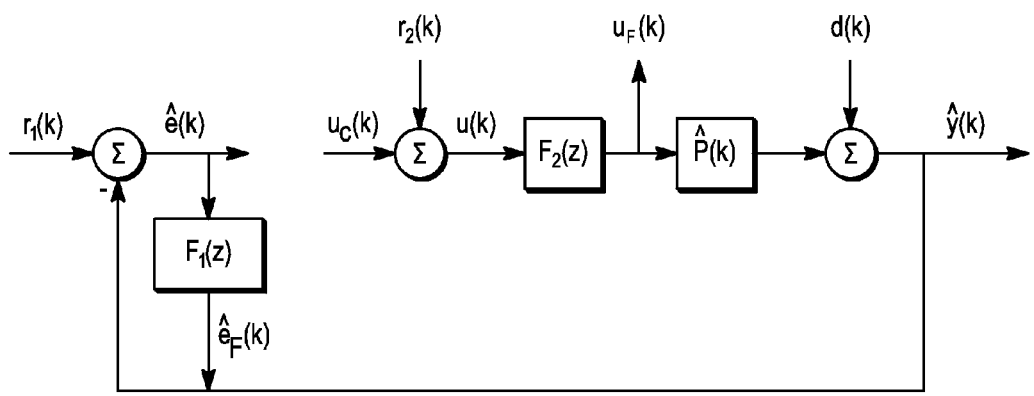
FIG. 17 is a block diagram of parameter estimator in discrete time where the signals into the parameter estimator are filtered to emphasize selected frequency ranges.

Depending upon the system configuration, different input and output signals will be available. However, the goal of the estimation algorithm is to match $\hat{P}$ to P, or equivalently $\hat{\theta}$ to $\theta$. It will be known to those skilled in the art, that the signals entering the parameter estimator may be filtered, as shown in FIG. 17, so as to emphasize certain frequencies and de-emphasize others.

We can use information about the SPM actuator to simplify this procedure. For example, in one embodiment the identification is run while the system is in open-loop, with $r_1(k)$ and $u_C(k)$ are both 0. Thus, the signals to be measured are $u(k)$ and $e(k)$ (or their filtered versions), from which $y(k)$ can be derived. In this case the system and the model are both stimulated with $u(k)=r_2(k)$ and the model output is compared to the measured output. In another embodiment, the system is run in closed-loop and the dynamics may be stimulated from a variety of signals such as $r_1(k)$ or $r_2(k)$.

For generating the discrete-time model of the main dynamics of a SPM actuator, we can restrict our model to be a second order discrete-time model. That is, the n would be 2 in Equations 18-22 and 24. Thus Equations 19 and 20 become $$\frac{Y(z)}{U(z)} = \frac{b_0+b_1z^{-1}+b_2z^{-2}}{1+a_1z^{-1}+a_2z^{-2}} \quad \text{Eq. 23}$$

and $$y(k)=-a_1y(k-1)-a_2y(k-2)+b_0u(k)+b_1u(k-1)+b_2u(k-2) \quad \text{Eq. 24}$$

respectively.

Furthermore as $r_1(k)$ enters into the calculation for both $y(k)$ and $\hat{y}(k)$, $e(k)$ and $\hat{e}(k)$ can be used in the generation of $\epsilon^2(k)$.

Next, the parameters are matched to the Discrete-Time Resonance Model. With the second order discrete-time model identified, the parameters in Equation 210 can be matched against the discrete resonances, $P_1(z)$, $P_2(z)$, or $P_3(z)$. PID parameters can then be matched to the extracted parameters, $\omega_0$, $\zeta_A$, and $K_A$ as described earlier.

We claim:

1. A method for controlling a scanning probe microscope, the method comprising:
   generating a scanning probe microscope model according to associated dynamics of the scanning probe microscope;
   selecting filter parameters that shape selected dynamics of the scanning probe microscope model;
   generating a notch filter using the filter parameters;
   encoding the notch filter as PID parameters; and
   implementing the PID parameters in a PID controller to control the scanning probe microscope.

2. A method for controlling a scanning probe microscope as in claim 1, where the scanning probe microscope model is a continuous-time model.

3. A method for controlling a scanning probe microscope as in claim 1, where the scanning probe microscope model is a sampled-data model.

4. A method as in claim 1, further comprising, generating the scanning probe microscope model by:
   measuring open loop frequency response measurement of the scanning probe microscope; and
   extracting an open loop actuator model of the scanning probe microscope dynamics.

5. A method as in claim 1, generating a model comprising:
   measuring a closed loop frequency response of the scanning probe microscope; and
   extracting an open loop actuator model of the scanning probe microscope dynamics.

6. A method as in claim 2, wherein the notch filter and PID parameters are generated directly from the continuous-time model.

7. A method as in claim 2, comprising:
   discretizing the identified continuous time model to form a digital model; and
   generating the notch filter and PID parameters from the digital model.

8. A method as in claim 1, wherein the resultant PID controller is implemented using analog circuitry.

9. A method as in claim 1 wherein the resultant PID controller is implemented using digital logic.

10. A method as in claim 1, wherein the filter parameters correspond to a notch filter with a gain, resonant frequency, and quality factor derived from the dynamics of the model.

11. A method as in claim 1, wherein:
    one of the filter parameters is gain; and
    the gain is selected such that magnitude of a response of the PID controller is at a desired valued for a given frequency.

12. A method as in claim 1, wherein:
    one of the filter parameters is gain; and
    the gain is selected such that an open loop magnitude of a combined PID controller and scanning probe microscope model is unity at a desired frequency.

13. A method as for controlling a scanning probe microscope including a cantilever and an actuator, the method comprising: automatically generating PID parameters that include a proportional gain, an integral gain, and a derivative gain, wherein automatically generating the PID parameters includes,
    measuring a closed loop system response during operation with a nominal controller;
    deriving an open loop system response from the measured closed loop system response;
    removing an effect of the nominal controller from the derived open loop system response to yield a response of the actuator of the scanning probe microscope;

performing a curve fit on a selected portion of the response of the actuator to obtain a transfer function; and generating resonance parameters from the transfer function, and using the generated resonance parameters to design a PID controller; and applying the PID parameters to operate the actuator beyond a resonant frequency of the actuator.

14. An instrument comprising:

a scanning probe microscope including a cantilever and an actuator;

a proportional-integral-derivative (PID) parameter generator that:
   generates a scanning probe microscope model according to associated dynamics of the scanning probe microscope;
   selects filter parameters that shape selected dynamics of the scanning probe microscope model;
   generates a notch filter using the filter parameters; and
   encodes the notch filter as PID parameters; and a PID controller that receives the PID parameters and controls the scanning probe microscope.

15. An instrument as in claim 14, wherein the PID parameter generator that generates a scanning probe microscope model comprises a PID parameter generator that generates a continuous-time model.

16. An instrument as in claim 14, wherein the PID parameter generator that generates a scanning probe microscope model comprises a PID parameter generator that generates a sampled-data model.

17. An instrument as in claim 14, wherein the PID parameter generator that generates a scanning probe microscope model comprises a PID parameter generator that:
   measures an open bop frequency response of the scanning probe microscope; and
   extracts an open loop physical system model of the scanning probe microscope dynamics.

18. An instrument as in claim 14, wherein the PID parameter that generates a scanning probe microscope model comprises a PID parameter that:
   measures a closed loop frequency response of the scanning probe microscope; and
   extracts an open loop physical system model of the scanning probe microscope dynamics.

* * * * *

UNITED STATES PATENT AND TRADEMARK OFFICE
CERTIFICATE OF CORRECTION

| | |
|---|---|
| PATENT NO. | : 7,987,006 B2 |
| APPLICATION NO. | : 11/846746 |
| DATED | : July 26, 2011 |
| INVENTOR(S) | : Daniel Y Abramovitch et al. |

It is certified that error appears in the above-identified patent and that said Letters Patent is hereby corrected as shown below:

In column 10, line 55, in Claim 13, after "method" delete "as".

In column 12, line 11, in Claim 17, delete "bop" and insert -- loop --, therefor.

Signed and Sealed this
Thirteenth Day of September, 2011

David J. Kappos
*Director of the United States Patent and Trademark Office*